United States Patent
Kudo et al.

(10) Patent No.: US 12,133,114 B2
(45) Date of Patent: Oct. 29, 2024

(54) COMMUNICATION DEVICE AND COMMUNICATION SYSTEM

(71) Applicant: NIPPON TELEGRAPH AND TELEPHONE CORPORATION, Tokyo (JP)

(72) Inventors: Riichi Kudo, Musashino (JP); Takeru Inoue, Musashino (JP); Atsushi Taniguchi, Musashino (JP); Kohei Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 433 days.

(21) Appl. No.: 17/604,052

(22) PCT Filed: Apr. 26, 2019

(86) PCT No.: PCT/JP2019/017947
§ 371 (c)(1),
(2) Date: Oct. 15, 2021

(87) PCT Pub. No.: WO2020/217459
PCT Pub. Date: Oct. 29, 2020

(65) Prior Publication Data
US 2022/0159512 A1 May 19, 2022

(51) Int. Cl.
*H04W 28/08* (2023.01)
*H04W 28/082* (2023.01)
*H04W 28/18* (2009.01)

(52) U.S. Cl.
CPC ..... *H04W 28/0942* (2020.05); *H04W 28/082* (2023.05); *H04W 28/18* (2013.01)

(58) Field of Classification Search
CPC ....... H04L 1/0026; H04L 1/20; H04L 47/626; H04W 52/223; H04W 72/542
See application file for complete search history.

(56) References Cited

U.S. PATENT DOCUMENTS

2005/0227716 A1* 10/2005 Tanaka ................ H04W 72/542
455/507
2014/0094208 A1* 4/2014 Egner ................... H04L 5/0023
455/513

FOREIGN PATENT DOCUMENTS

| JP | 2012-160900 A | 8/2012 |
| JP | 2018-32939 A | 3/2018 |
| WO | WO-2004/098225 A1 | 11/2004 |

OTHER PUBLICATIONS

IEEE Std 802.11 ac (TM)-2013, IEEE Standard for Information Technology—Telecommunications and Information Exchange Between Systems Local and Metropolitan Area Networks-Specific requirements, Part 11: Wireless LAN Medium Access Control (MAC) and Physical Layer (PHY) Specifications, Dec. 2016.

(Continued)

*Primary Examiner* — Elton Williams

(57) ABSTRACT

An event regarding control of a terminal that significantly affects communication quality with which communication between the terminal and an external communication device is performed is predicted by acquiring surrounding information of the terminal using a surrounding environment information collection unit, and a packet loss caused in communication, communication disconnection, and communication quality that does not meet required performance are prevented using communication control to change setting related to communication, such as selection/addition/deletion of a communication counterpart, selection/change of a communication scheme, a change in modulation scheme, coding rate, and number of spatial multiplexings of communication, and a change in setting of an automatic gain controller of a receiver for communication.

6 Claims, 10 Drawing Sheets

(56) References Cited

OTHER PUBLICATIONS

Ghosh, Amitava, et al. "Millimeter-wave Enhanced Local Area Systems: A high-data-rate Approach for Future Wireless Networks." IEEE Journal on Selected Areas in Communications 32.6 (2014): 1152-1163.

* cited by examiner

COMMUNICATION DEVICE AND COMMUNICATION SYSTEM

CROSS-REFERENCE TO RELATED APPLICATIONS

This application is a 371 U.S. National Phase of International Application No. PCT/JP2019/017947 filed on Apr. 26, 2019. The entire disclosure of the above application is incorporated herein by reference.

TECHNICAL FIELD

The present disclosure relates to control of communication for a system that uses communication and a device that uses communication.

BACKGROUND ART

Internet of things (IoT) in which various devices are connected to the Internet has been increasingly realized, and connection of various devices such as vehicles, drones, and construction machinery vehicles is in progress. Supporting wireless standards such as a wireless local area network (LAN) defined by the standard specification IEEE 802.11, Bluetooth (registered trademark), LTE or 5G cellular communication, low power wide area (LPWA) communication for IoT, an electronic toll collection system (ETC), Vehicle Information and Communication System (VICS) (registered trademark), and ARIB-STD-T109 as wireless communication standards have been developed, and are expected to be spread in the future is expected.

Wireless communication has been used for various applications, but wireless communication does not always meet required conditions for communication quality depending on services, which is problematic. For example, since high frequencies in a millimeter band are used for IEEE 802.11ad and 5G of cellular communication, blocking due to shielding objects between transmission and reception in wireless communication causes a serious problem. Blocking affects communication quality in cases of other types of communication as well. Blocking due to shielding objects and changes in propagation environments due to motion of reflecting objects affect communication quality of wireless communication not only at frequencies in a millimeter wave band but also at other frequencies. In addition, it is also known that Doppler shift caused by movement of a reflecting object affects communication.

CITATION LIST

Non Patent Literature

Non Patent Literature 1: IEEE Std 802.11ac (TM)-2013, IEEE Standard for Information technology-Telecommunications and Information Exchange Between Systems Local and Metropolitan Area Networks-Specific Requirements, Part 11: Wireless LAN Medium Access Control (MAC) and Physical Layer (PHY) Specifications, December 2013

Non Patent Literature 2: Ghosh, Amitava, et al. "Millimeter-wave Enhanced Local Area Systems: A High-data-rate Approach for Future Wireless Networks." IEEE Journal on Selected Areas in Communications 32.6 (2014): 1152-1163.

SUMMARY OF THE INVENTION

Technical Problem

In a case in which wireless communication functions are mounted in vehicles, drones, construction machinery vehicles, robots, and other devices and there are required conditions in relation to throughputs, delays, continuity, stability, and other aspects of communication quality for the communication thereof, there is a problem that communication quality due to changes in surrounding environment significantly affects services and systems provided by the devices.

Thus, in view of the aforementioned problem, an object of the present disclosure is to provide a communication system and a communication device capable of addressing variations in communication quality.

Means for Solving the Problem

A communication system according to the present disclosure is adapted such that a device that has a wireless communication function predicts future communication quality using surrounding environment information including information obtained from a camera, a sensor, and other devices that acquire a surrounding environment and position information of surrounding objects provided as a notification through communication and controls communication setting with a counterpart device in accordance with the future communication quality.

A communication system according to the present disclosure includes a communication device according to the present disclosure and an external communication device that communicates with the communication device.

The communication device according to the present disclosure is a communication device that communicates with an external communication device, the communication device including: a device management unit configured to generate device information including position information of the device itself; a surrounding environment information collection unit configured to collect surrounding environment information that is information related to a surrounding environment of the device itself; a communication unit configured to communicate with the external communication device; a communication prediction unit configured to predict communication quality of the communication unit using the device information and the surrounding environment information; and a communication control unit configured to control communication setting of the communication unit based on the communication quality predicted by the communication prediction unit.

In the present disclosure, the communication prediction unit may output the communication quality of the communication unit using machine learning from the surrounding environment information and the device information using an input and output relationship between the surrounding environment information, the device information, and communication quality which are learned in advance.

In the present disclosure, the communication prediction unit may output setting for control of communication with the external communication device using machine learning from the surrounding environment information and the device information using an input and output relationship between the surrounding environment information, the device information, communication quality, and a method for controlling communication which are learned in advance.

In the present disclosure, the communication device may further include: a communication evaluation unit configured to evaluate communication quality of the communication unit, the communication evaluation unit may evaluate the communication quality for communication setting of the communication unit selected by the communication control unit, and reinforcement learning may be performed to enhance an index related to communication quality among the surrounding environment information, the device information, the evaluated communication quality, and the selected communication setting, using the communication quality evaluated by the communication evaluation unit.

In the present disclosure, the communication prediction unit may detect a communication quality degradation event in which degradation of communication quality is predicted, using the surrounding environment information and the device information, and if the communication quality degradation event is input, the communication control unit may (i) start a process for establishing communication with a device that is different from the external communication device, or (ii) change at least one of a modulation scheme, a coding rate, and the number of spatial multiplexings used for the communication with the external communication device such that a communication bit number per unit time decreases, or (iii) control a signal reflector installed in a communication area, which is a range where the communication unit is able to perform communication, to change a radio wave propagation environment, or (iv) change a frequency at which degradation of the communication quality is predicted into a frequency at which the communication quality is predicted to be less changed, or (iv) change a communication speed in third or higher layers in an open system interconnection (OSI) reference model into a mode that supports a lower communication speed.

In the present disclosure, the communication prediction unit may detect a communication quality improvement event in which an improvement in communication quality is predicted, using the surrounding environment information and the device information, and if the communication quality improvement event is input, the communication control unit may (i) start a process for establishing data communication using a channel at a higher frequency that is able to be used due to the improvement in the communication quality, or (ii) change at least one of a modulation scheme, a coding rate, and the number of spatial multiplexings used for the communication with the external communication device such that a communication bit number per unit time increases, or (iv) change a communication speed defined in third or higher layers in an OSI reference model into a mode that supports a higher communication speed.

In the present disclosure, the device information may include at least one kind of the position information of the device itself, speed information of the device itself, information regarding a position, an orientation, or directivity of an antenna of the communication unit, communication information of the communication unit, power supply information of the device itself, information unique to the device itself, and position information or speed information of components of the device itself.

Note that the aforementioned aspects of the present disclosure can be combined unless the combinations are possible.

Effects of the Invention

According to the present disclosure, it is possible to change communication setting with which communication is performed with another device such that quality of the communication can be maintained, by predicting in advance that quality of the wireless communication will be degraded, and it is thus possible to curb or eliminate influences of degradation of communication quality. Alternatively, it is possible to use a bit rate at which transmission can be performed in a lower layer such as a physical layer to the maximum extent by predicting in advance that wireless communication with high quality can be used and immediately performing transmission of a large number of bits to improve or lower the bit rate at which transmission is performed in an upper layer in accordance with variations in the lower layer.

DESCRIPTION OF EMBODIMENTS

Figure 1:
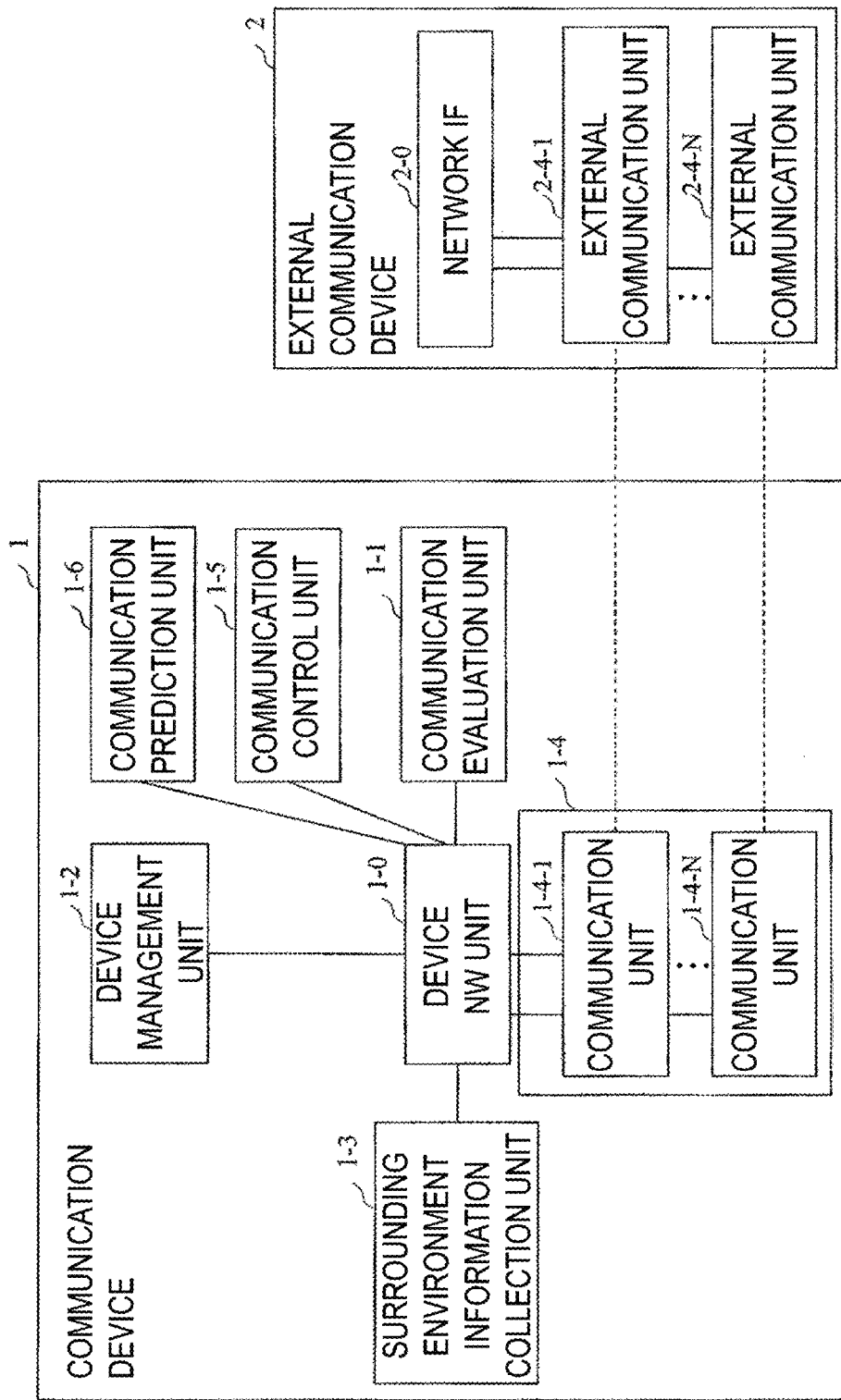
FIG. 1 is a block diagram illustrating a configuration example of a communication system according to the present disclosure.

Hereinafter, embodiments of the present disclosure will be described in detail with reference to drawings. Note that the present disclosure is not limited to the embodiments described below. These exemplary embodiments are just illustrative examples, and the present disclosure can be implemented in various modified or improved forms based on knowledge of those skilled in the art. Note that components with the same reference signs in the specification and the drawings are assumed to be the same components.

A communication system according to an embodiment includes a communication device and an external communication device, the former includes: one or more communication units capable of communicating with the external communication device (a wireless base station, a terminal, or a terminal that includes another communication device); a device management unit that controls communication; a communication evaluation unit that evaluates communication quality of the communication unit; a surrounding environment information collection unit that acquires surrounding environment information using a camera, a sensor, or the like; a communication prediction unit that outputs information related to prediction of communication quality using the surrounding environment information; a device network unit that performs these inputs and outputs; and a communication control unit that controls operations, running, communication, and the like based on the predicted communication quality.

It is possible to include one or more communication units and to use a wireless LAN defined by IEEE 802.11, Wigig, IEEE 802.11p, an ITS communication standard, cellular communication such as LTE or 5G, wireless communication such as a low power wide area (LPWA), or communication using sound waves, electricity, or light. Hereinafter, the number of communication units is defined as N. However, N is a positive number that is equal to or greater than 1.

According to the present disclosure, a throughput, a delay, continuity, stability, and information related to variations thereof in uplink or downlink communication between a wireless base station and a terminal or in lines between terminals are predicted using, for the communication device (the wireless base station or the terminal), surrounding environment information obtained, and by a surrounding environment information collection device such as a camera or a sensor, the communication is controlled. Through the control as described above, the present disclosure improves communication quality, avoid communication quality degradation that is crucial for services, or on the contrary, predicts in advance an improvement in communication quality to appropriately improve the amount of bits to be transmitted in accordance with an increase in amount of bits that can be transmitted in a physical layer or to increase or decrease the amount of bits to be transmitted in third or higher layers in an ISO reference model. As a result, the present disclosure enables more efficient utilization of wireless communication.

FIG. 1 is a block diagram illustrating a configuration example of a communication system according to the first embodiment. In the present embodiment, the communication device corresponds to a terminal out of a base station and a terminal in Wi-Fi or cellular communication, for example. The communication system includes a communication device 1 and an external communication device 2 that communicate with each other. Although FIG. 1 illustrates an example in which the system includes one external communication device 2 for easy understanding, the system according to the present disclosure may include two or more (M is an integer) external communication devices 2.

A communication device 1 includes: a device network unit 1-0 that is a functional block in the communication device and performs inputs and outputs; a communication evaluation unit 1-1 that evaluates communication quality with which communication between the communication device and an external communication device is performed; a device management unit 1-2 that controls the communication device, components of the communication device, and communication of the communication device and generates device information; a surrounding environment information collection unit 1-3 that collects surrounding environment information of the communication device using a visible light camera, an infrared camera, an electromagnetic wave sensor, an optical sensor, a sound wave sensor, or the like; a communication unit 1-4 that communicates with the external communication device 2; a communication control unit 1-5 that selects a communication method based on a result output by the communication prediction unit 1-6; and the communication prediction unit 1-6 that predicts communication quality using the surrounding environment information and the device information and provides an instruction to the communication control unit 1-5 based on the predicted communication quality.

The communication unit 1-4 includes communication units 1-4-1 to 1-4-N (N is an integer that is equal to or greater than 1).

The external communication device 2 includes external communication units 2-4-1 to 2-4-N that communicate with the communication units 1-4-1 to 1-4-N of the communication device 1, respectively, and a network interface (IF) 2-0 that is connected thereto.

Here, the device information generated by the device management unit 1-2 is arbitrary information related to the communication device 1. The device information generated by the device management unit 1-2 includes one or more of the position, the speed, the orientation, the posture, the ID, the state, or control of the communication device 1 or components of the communication device 1. In a case in which the communication device 1 is provided in a base station, the device information generated by the device management unit 1-2 is information related to the base station. In a case in which the communication device 1 is provided in a terminal, the device information generated by the device management unit 1-2 is information related to the terminal. The device information generated by the device management unit 1-2 may include device information including the position, the speed, the orientation, the posture, the ID, the state, the state related to control, or the like of a communication counterpart (a base station or a terminal in a case in which the communication device 1 is provided in a terminal, or a terminal in a case in which the communication device 1 is provided in a base station). The device information generated by the device management unit 1-2 may further include the attachment position, a speed, an orientation, an ID, a state, and control of an antenna provided in the communication unit 1-4.

The surrounding environment information in the surrounding environment information collection unit 1-3 is arbitrary information from which information regarding the surrounding environment of the communication device 1 can be acquired. The surrounding environment information in the surrounding environment information collection unit 1-3 includes, for example, information detected by a visible light camera, an infrared camera, or an arbitrary sensor such as an electromagnetic wave sensor, an optical sensor, or a sound wave sensor and position/speed information of a surrounding object provided as a notification through communication.

The communication method selected by the communication control unit 1-5 is an arbitrary communication method provided in the communication device 1. As the communication method selected by the communication control unit 1-5, it is possible to exemplify a modulation scheme, a coding rate, a frequency, a channel, a bandwidth, a resource block, a transmission timing, a communication buffer, priority, the number of multiplexings, for example.

The prediction of communication quality is performed by learning an input and output relationship through machine learning using the surrounding environment information and the device information as input data and using the communication quality as output data. An arbitrary machine learning algorithm is used, and it is possible to exemplify machine learning algorithms such as a support vector machine, a multilayer perceptron, a k-nearest nearest neighbor method, and a random forest, learning based on deep learning such as a recurrent neural network (RNN), a convolutional neural network (CNN), and a long short term memory (LSTM), and on-line learning, for example.

In the machine learning performed on the surrounding environment information and the device information, it is also possible to learn communication quality and a strategy for the communication quality after converting the surrounding environment information into information such as positions, speeds, and the like of objects such as cars and humans. The communication quality predicted here is communication quality of an arbitrary time after information regarding a signal source input to the communication prediction unit 1-6. The arbitrary time is an arbitrary time after elapse of time required by the communication control unit 1-5 to control the communication unit 1-4 after the surrounding environment information is acquired. Output data may include timing information. For example, what communication quality is predicted to be achieved, when the communication quality is predicted to be achieved, and when and how communication control is to be set may be output as output data.

This learning can also be performed in an actual environment with the communication device 1 actually performing communication. Also, this learning can also be performed using another device or data acquired by another device specially prepared for learning. In addition, it is possible to perform the learning in a simulation space that simulates an environment that is as close to an actual environment in a real world as possible. In addition, the learning can also be performed by the communication prediction unit 1-6. Furthermore, the learning can be performed in the simulation space, and the obtained learning results can be used in the communication prediction unit 1-6. It is also possible to use an input and output relationship learned in the simulation space or by a similar external terminal as transfer learning.

The communication prediction unit 1-6 may output setting for prediction of communication quality or for communication control performed along with the prediction of communication quality, from the input surrounding environment information and device information, using the input and output relationship learned in advance. The setting for the communication control means selection or a strategy regarding a communication method such as the type of communication, the number of redundant lines, the type of redundant line, a communication mode thereof, a communication counterpart, a modulation scheme of communication, a coding rate, a frequency, channel selection, a bandwidth, resource block selection, a transmission timing, a communication buffer, the number of multiplexings of communication in time, frequency, or space, and priority of these conditions.

As described above, the predicted communication quality may be output, or the setting for communication control may be output, from the communication prediction unit 1-6 to the communication control unit 1-5. In a case in which the communication prediction unit 1-6 outputs communication quality, the communication control unit 1-5 determines, in advance, setting for communication to be selected for the communication quality and controls communication from a signal input from the communication prediction unit 1-6. If the communication control unit 1-5 is notified of degradation of communication quality or a degree thereof by the communication prediction unit 1-6, for example, the communication control unit 1-5 can lower the modulation scheme or the coding rate to lower the bit rate, or send a signal for a notification to lower the bit rate to prevent a packet error or resending from occurring. Also, if the communication control unit 1-5 is notified of degradation of communication quality or a degree thereof by the communication prediction unit 1-6, for example, the communication control unit 1-5 can change the device adopting the frequency, the channel, or the resource block due to which the communication quality is changed into a frequency channel that is unlikely to be affected to perform communication. Alternatively, the communication control unit 1-5 can infer a radio wave propagation environment of radio waves at a frequency used for communication from the surrounding environment information and increase or decrease the number of simultaneous transmission streams that are spatially multiplexed.

In a case in which the communication prediction unit 1-6 directly determines setting for communication control to be employed by the communication control unit 1-5, it is also possible to output, to the communication control unit 1-5, setting selected using, for a communication method which will be described later, an input and output relationship obtained through learning for better setting. At this time, it is also possible to perform reinforcement learning using information related to communication quality as an index and to cause communication control to be learned to maximize a predefined reward or index. At this time, the communication evaluation unit 1-1 can determine a result in regard to the setting of the communication control performed by the communication control unit 1-5, determine success/failure of the strategy, determine a reward in accordance with the evaluation on the setting, and use the success/failure and the reward for reinforcement learning performed by the communication prediction unit 1-6. The aforementioned communication method means the type of communication, the number of redundant lines, a communication counterpart, a modulation scheme of the communication, a coding rate, a frequency, a channel, a bandwidth, a resource block, a transmission timing, a communication buffer, the number of multiplexings of communication in time, frequency, or space, a network path, reflector control using a metamaterial or metal, priority of the setting, and the like.

In order to limit targets of learning and estimation of communication quality, it is also possible to perform the prediction and the learning such that the communication prediction unit 1-6 determines only specific events related to communication quality. For example, the learning can be performed such that the communication prediction unit 1-6 predicts only a case in which communication quality satisfies a predefined condition, and the communication control unit 1-6 can select the communication scheme at the time of the event.

As the case in which the specific condition is satisfied, it is possible to use a condition of a communication quality degradation event that communication quality becomes low quality under a predefined condition, for example. This is because such a condition may lead to a problem that is crucial for a user's feeling of the user or an application using communication.

Alternatively, it is possible to use, as a communication quality improvement event, a condition under which communication quality is improved on the contrary. This means that in a case in which a wireless access with a limited available condition is used, it is possible to efficiently use wireless resources by changing the modulation scheme, the coding rate, the number of spatial multiplexings, and the like or starting utilization of a higher frequency channel through prior prediction of an available timing or condition.

As the communication quality degradation event, it is possible to determine a time at which a predefined index of communication quality satisfies a predefined condition or an event categorized as communication quality degradation due to a change in surrounding environment information or device information through identification in machine learning. The communication quality improvement event is similarly defined as an event that a predefined index of communication quality satisfies a predetermined condition or an event categorized as a communication quality improvement due to a change in surrounding environment information or device information through identification in machine learning. Here, the feature amounts extracted from a plurality of parameters include a case in which degradation of a received signal strength indicator (RSSI) and degradation of a bit number per unit time occur at the same time, for example.

Here, as the index of communication quality, it is possible to exemplify a bit number per unit time, bit numbers per time and frequency, a packet loss, a packet loss rate, RSSI degradation, reference signal received quality (RSRQ) degradation, a packet transmission rate, a variation from these parameters under normal conditions, occurrence of a problem in an application, and feature amounts extracted from these plurality of parameters.

If a communication quality degradation event is input, then the communication control unit 1-5 executes the following processing, for example.

The communication control unit 1-5 starts a process for establishing communication with a device that is different from the external communication device 2.

The communication control unit 1-5 changes at least one of a modulation scheme, a coding rate, and the number of spatial multiplexings used for communication with the external communication device 2 such that the communication bit number per unit time decreases.

The communication control unit 1-5 controls a signal reflector installed in a communication area, which is a range where the communication unit 1-4 is able to perform communication, to change a radio wave propagation environment.

The communication control unit 1-5 changes a frequency at which degradation of communication quality is predicted into a frequency at which communication quality is predicted to be less changed.

The communication control unit 1-5 changes a communication speed in the third or higher layers in an open system interconnection (OSI) reference model is changed into a mode that supports a lower communication speed.

If a communication quality improvement event is input, then the communication control unit 1-5 executes the following processing, for example.

The communication control unit 1-5 starts a process for establishing data communication using a higher frequency channel that is able to be used due to an improvement in the communication quality.

The communication control unit 1-5 changes at least one of a modulation scheme, a coding rate, and the number of spatial multiplexings used for communication with the external communication device 2 such that a communication bit number per unit time increases.

The communication control unit 1-5 changes a communication speed defined in the third or higher layers in an OSI reference model into a mode that supports a higher communication speed.

Figure 2:
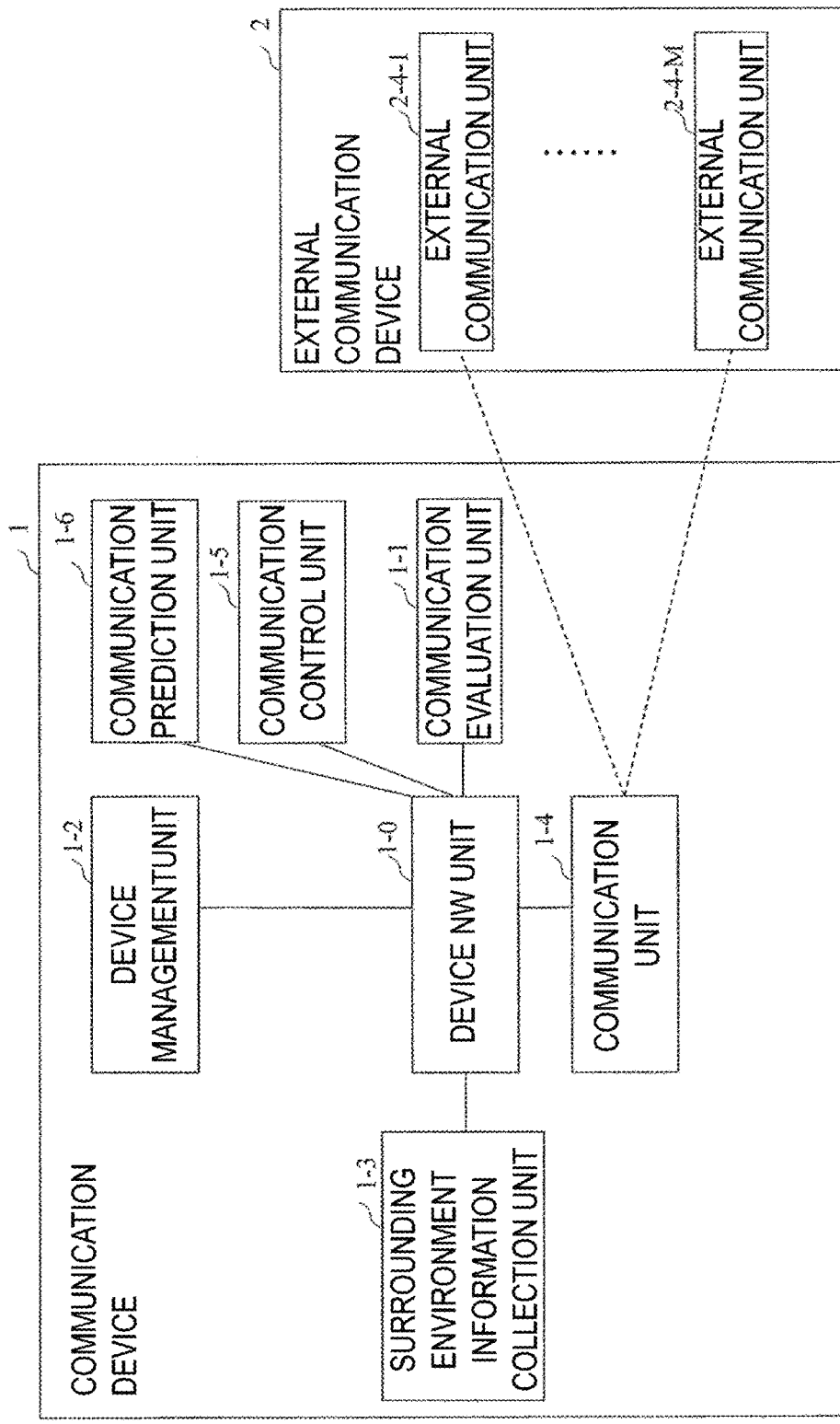
FIG. 2 is a block diagram illustrating a configuration example of a communication system according to the present disclosure.

FIG. 2 is a block diagram illustrating a configuration example of a communication system according to the second embodiment. In the present embodiment, a communication device 1 corresponds to a base station out of a base station and a terminal in Wi-Fi or cellular communication, for example, or a terminal in communication between terminals. The communication system according to the second embodiment includes the communication device 1 and an external communication device 2 that communicate with each other. Although FIG. 2 illustrates an example in which the system includes one external communication device 2 for easy understanding, the system according to the present disclosure may include two or more external communication devices 2.

The communication device 1 includes: a device network unit 1-0 that is a functional block inside the communication device 1 and performs inputs and outputs; a communication evaluation unit 1-1 that evaluates communication quality with which communication between the communication device 1 and the external communication device 2 is performed; a device management unit 1-2 that controls the communication device 1, components of the communication device 1 and communication of the communication device 1 and generates device information; a surrounding environment information collection unit 1-3 that collects surrounding environment information of the communication device 1 using a visible light camera, an infrared camera, an electromagnetic wave sensor, an optical sensor, a sound wave sensor, or the like; a communication unit 1-4 that communicates with the external communication device 2; a communication control unit 1-5 that selects a communication method based on a result output by the communication prediction unit 1-6; and a communication prediction unit 1-6 that predicts future communication quality using the surrounding environment information and the device information and provides an instruction to the communication control unit 1-5 based on the predicted communication quality.

The communication unit 1-4 includes communication units 1-4-1 to 1-4-N (N is an integer that is equal to or greater than 1).

The external communication device 2 includes external communication units 2-4-1 to 2-4-M that communicate with the communication units 1-4 of the communication device 1. Here, M is an integer that is equal to or greater than 1.

Here, the device information generated by the device management unit 1-2, the surrounding environment information in the surrounding environment information collection unit 1-3, the communication method selected by the communication control unit 1-5, and the prediction of communication quality using the surrounding environment information and the device information are as described above in the first embodiment of the communication system.

To learn a relationship with communication quality using the surrounding environment information and the device information, the communication prediction unit 1-6 can define the feature amount of input information and perform learning using a machine learning algorithm such as a support vector machine, multilayer perceptron, a k-nearest neighbor method, or a random forest, perform learning using a neural network such as deep learning, or perform on-line learning. For example, it is also possible to learn communication quality and a strategy for the communication quality after converting the surrounding environment information into information such as positions and speeds of objects such as cars or humans in the aforementioned machine learning algorithm. The learning can also be performed in an actual environment with the communication device actually performing communication. In addition, the learning can also be performed using another device or data acquired by another device specially prepared for learning. Moreover, it is also possible to perform the learning in a simulation space that simulates an environment that is as close to an actual environment in the real world as possible. The communication prediction unit 1-6 can perform the learning, or the learning can be performed in a simulation space, and the communication prediction unit 1-6 can use an obtained result of the learning.

The communication prediction unit 1-6 may output predicted communication quality or may output setting for communication control, which will be described later, to the communication control unit 1-5. The aforementioned setting for communication control includes a modulation scheme, a coding rate, a frequency, a channel, a frequency bandwidth, a resource block, a transmission timing, a communication buffer, priority, the number of multiplexings, scheduling, a required delay, a network path, reflector control using a metamaterial or metal, and the like. In a case in which the communication prediction unit 1-6 outputs communication quality, the communication control unit 1-5 determines, in advance, setting for communication control to be selected for the communication quality and determines the communication setting from an input signal of the communication prediction unit 1-6. If the communication control unit 1-5 is notified of the degradation of communication quality at a certain frequency, for example, by the communication prediction unit 1-6, then the communication control unit 1-5 can lower the modulation scheme or the coding rate to lower the bit rate and thus prevent a packet error or resenting from occurring. Also, if the communication control unit 1-5 is notified of degradation of communication quality at a certain frequency, for example, by the communication prediction unit 1-6, then the communication control unit 1-5 can cause the communication device adopting the frequency, the channel, or the resource block that is likely to be affected by the result obtained from the surrounding environment information to change the frequency channel into the one that is unlikely to be affected. Also, if the communication control unit 1-5 is notified of degradation of communication quality at a certain frequency, for example, by the communication prediction unit 1-6, then the communication control unit 1-5 can change a scheduling method of the external communication units 2-4-1 to 2-4-M with which communication is being performed, to lower utilization priority of the frequency resource that leads to degradation of communication quality or to hand over the communication to another base station. Alternatively, the communication control unit 1-5 can also infer a radio wave multi-path environment at a frequency used for communication from the surrounding environment information and increase or decrease the number of simultaneous transmission streams to be spatially multiplexed.

In a case in which the communication prediction unit 1-6 outputs setting for communication control, it is also possible to output, to the communication control unit 1-5, setting selected using an input and output relationship obtained through learning for better setting performed on a communication method, which will be described later. At this time, it is also possible to perform reinforcement learning using information related to communication quality as an index and cause the communication control to be learned to maximize a predefined reward or the index. The aforementioned communication method includes a modulation scheme, a coding rate, a frequency, a channel, a bandwidth, a resource block, a transmission timing, a communication buffer, priority, the number of multiplexings, scheduling, a required relay, a network path, reflector control using a metamaterial or metal, and the like.

At this time, in regard to the setting for communication control performed by the communication control unit 1-5, the communication evaluation unit 1-1 can determine communication quality obtained as a result of the communication control, the evaluation result of the communication evaluation unit 1-1 can be used as teacher data to determine success/failure of the strategy, to determine a reward in accordance with the evaluation on the setting, and the success/failure and the reward can be used for reinforcement learning performed by the communication prediction unit 1-6. Here, the evaluation means arbitrary evaluation through which it is possible to determine categorization of an application range of the input and output relationship, prediction accuracy, or importance of input parameters. The evaluation result is, for example, prediction accuracy of communication quality. The evaluation is preferably performed at a predefined cycle, such as every one second.

Figure 3:
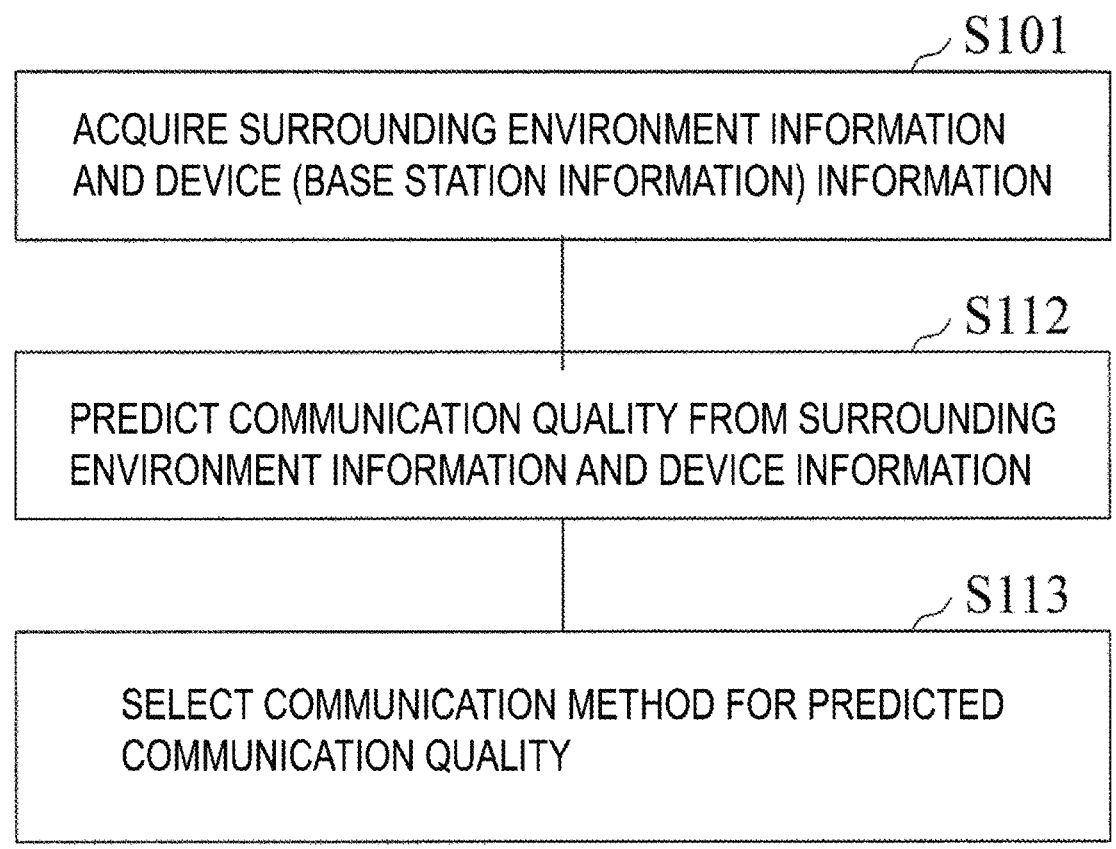
FIG. 3 is a flow diagram illustrating an example of a first communication control method.

FIG. 3 is a flow diagram illustrating an example of a first communication control method. To predict communication quality, the surrounding environment information collection unit 1-3 generates surrounding environment information, the device management unit 1-2 generates device information (S101), and the communication prediction unit 1-6 predicts communication quality (S112). The communication control unit 1-5 selects and performs a communication method, which will be described below, based on the prediction result of the communication prediction unit 1-6 (S113). The aforementioned communication method includes the modulation scheme, the coding rate, the frequency, the channel, the bandwidth, the resource block, the transmission timing, the communication buffer, the priority, the number of multiplexings, the scheduling, the required delay, the network path, the reflector control method using a metamaterial or metal, and the like.

A communication method to improve communication quality, reduce a communication fee, avoid crucial degradation of communication quality, or use an improvement in communication quality through Step S113 is selected. In a case in which communication quality becomes low, the arrival bit numbers are prevented from being lowered due to a packet error or retransmission, by lowering the bit numbers to be transmitted. In a case in which communication quality is improved, wireless resources are efficiently used by increasing the bit numbers to be transmitted or using a frequency channel that is temporarily available. As for reduction of a communication fee, it is possible to reduce the cost by defining communication using a licensed band such as a mobile phone line as being performed only in a case in which communication quality is below a threshold value, and using the wireless access requiring a high communication line fee at a minimum frequency.

Figure 4:
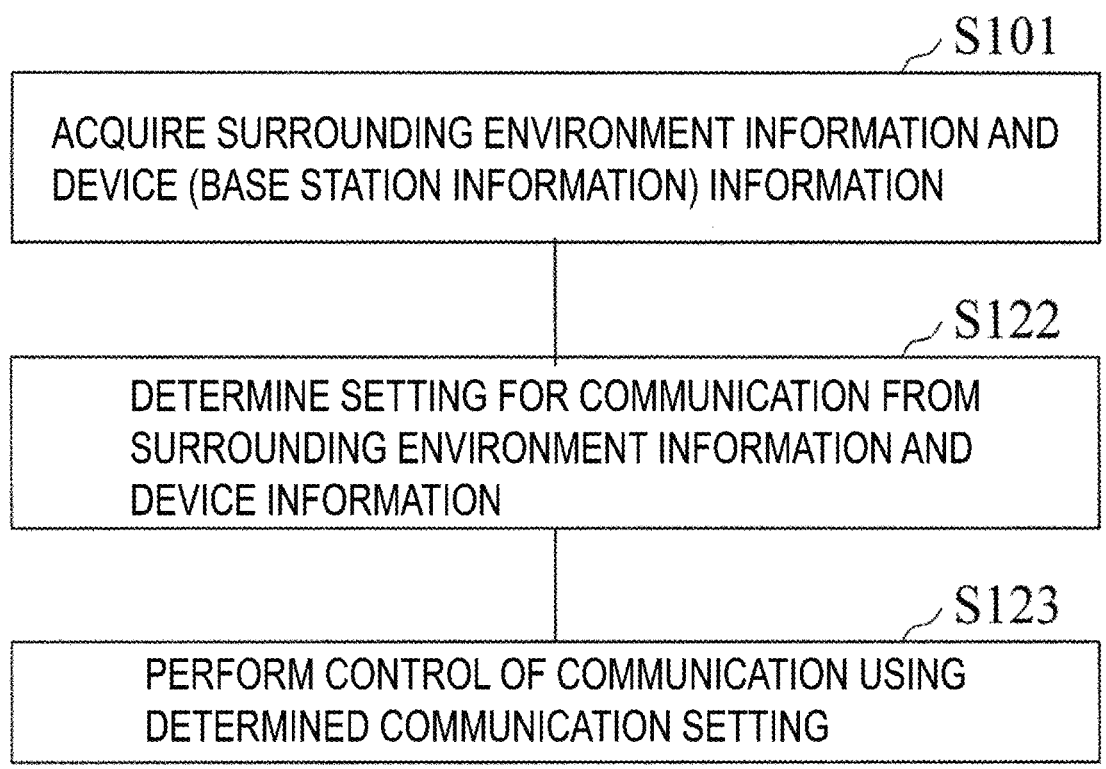
FIG. 4 is a flow diagram illustrating an example of a second communication control method.

FIG. 4 is a flow diagram illustrating an example of a second communication control method. The surrounding environment information collection unit 1-3 generates surrounding environment information, and the device management unit 1-2 generates device information (S101). The communication prediction unit 1-6 uses an input and output relationship in which setting for communication control has been learned for the surrounding environment information and the device information to determine setting for communication control from the input surrounding environment information and device information (S122). The communication control unit 1-5 performs control related to communication based on the setting input from the communication prediction unit 1-6 (S123).

Figure 5:
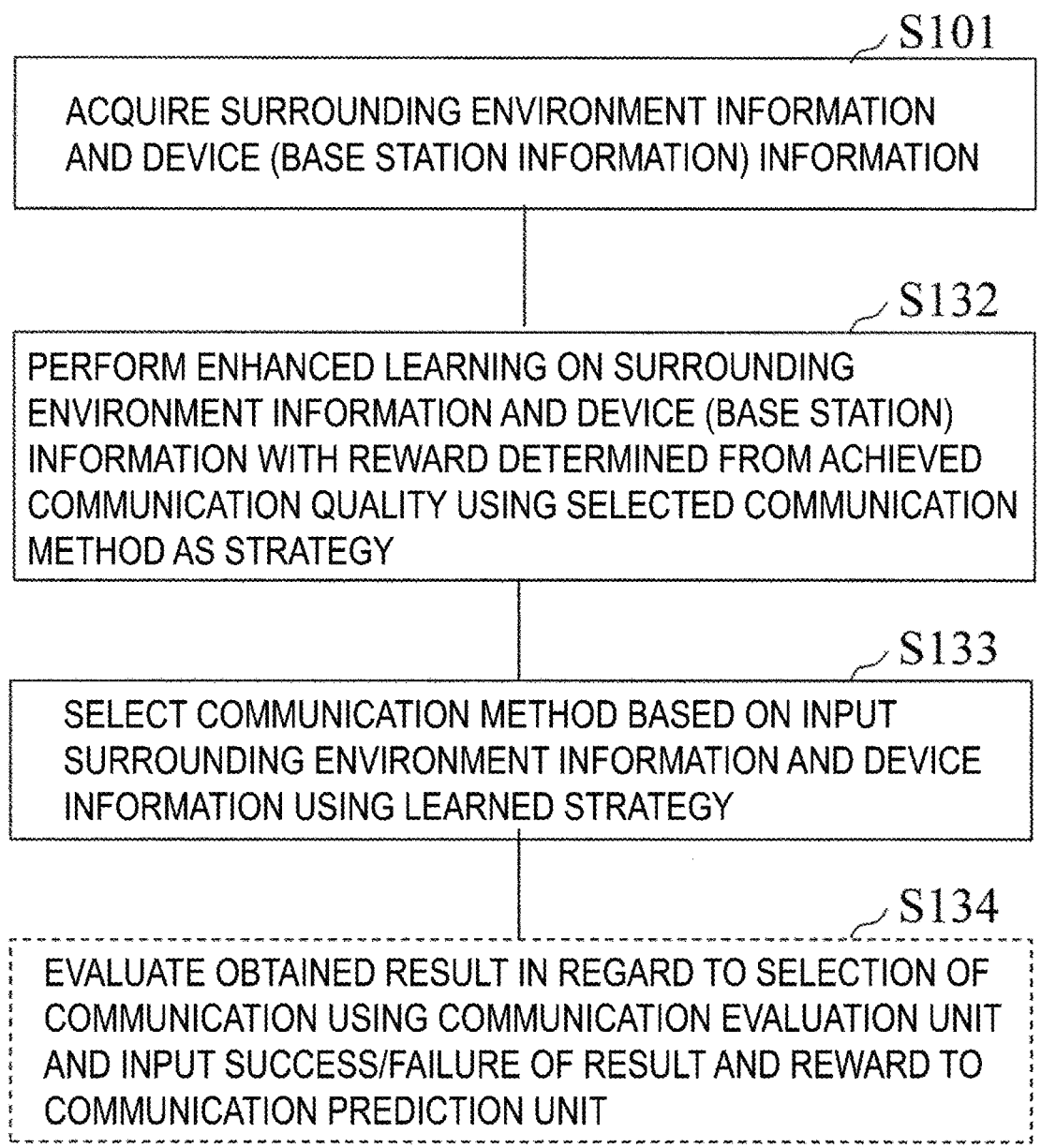
FIG. 5 is a block diagram illustrating a step configuration of a third communication control method.

FIG. 5 is a flow diagram illustrating a third communication control method.

To predict communication quality, the surrounding environment information collection unit 1-3 generates surrounding environment information, and the device management unit 1-2 generates device information (S101).

The communication prediction unit 1-6 performs reinforcement learning using the surrounding environment information and the device information as inputs, using the setting for communication control as an output, and achievement of an index related to communication quality as a reward (S132). The communication prediction unit 1-6 determines a modulation scheme, a coding rate, a frequency, a channel, a bandwidth, a resource block, a transmission timing, a communication buffer, priority, the number of multiplexings, scheduling, a required delay, a network path, or a reflector control method using a metamaterial or metal to maximize the predefined reward or value based on the result of the reinforcement learning, and outputs the determined result to the communication control unit 1-5, and the communication control unit 1-5 performs control related to communication based on the input setting (S133).

Further, effects of the communication control performed by the communication control unit 1-5 may be evaluated by the communication evaluation unit 1-1 (S134). In this case, the communication evaluation unit 1-1 generates success/failure and reward information and feeds back the success/failure or the reward information to the communication prediction unit 1-6. The communication prediction unit 1-6 can thus perform learning for a better strategy.

Figure 6:
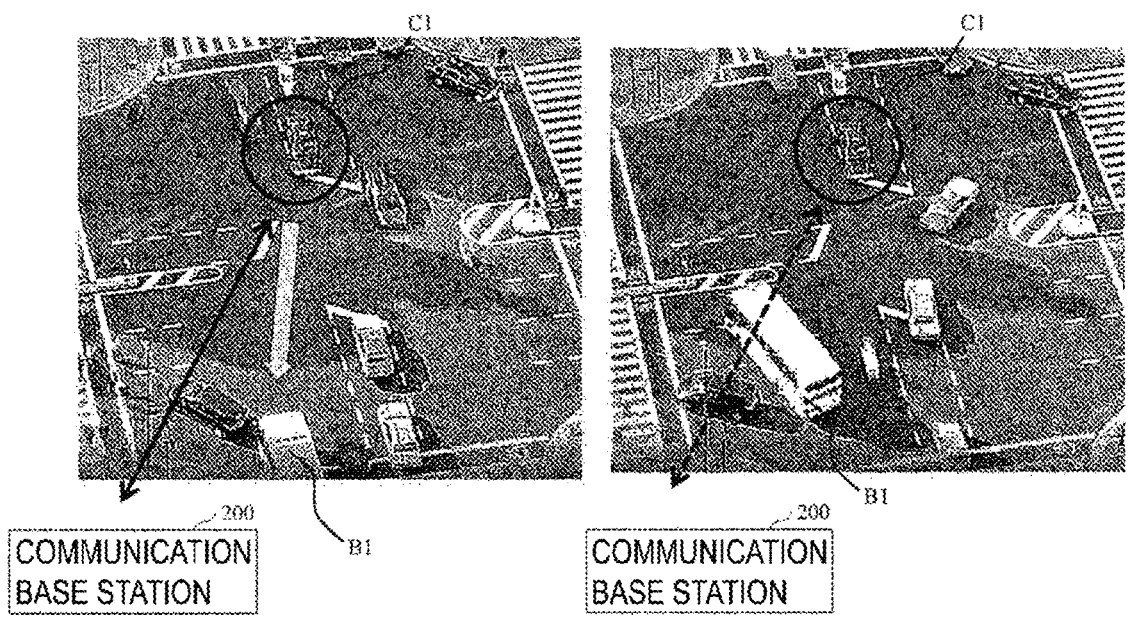
FIG. 6 is a diagram for explaining effects of the communication system according to the present disclosure.

FIG. 6 illustrates a diagram of a case in which communication is blocked by a large vehicle at an intersection. A vehicle C1 includes the communication device 1, and a communication base station 200 functions as the external communication device 2. The communication base station 200 and the car C1 are performing wireless communication, and the communication prediction unit 1-6 has already learned that throughput degradation will occur when a large vehicle turns left at the intersection. The effect is caused not always by blocking of a propagation path but by changes in complicated propagation state at the intersection. The communication device 1 acquires, as surrounding environment information, that a large vehicle B1 has approached from the front side and has started to turn left, from a video of a camera mounted in the vehicle C1, acquires, as device information of the device itself, the position, the speed, and the orientation of the vehicle, and predicts, at the communication prediction unit 1-6, that there is a probability that communication quality of the communication unit 1-4 may be affected. The communication control unit 1-5 performs the following processing in response to the result.

The communication control unit 1-5 reduces the amount of bits per unit time by lowering the modulation scheme, the coding rate, or the like of the communication unit 1-4.

The communication control unit 1-5 uses communication that is strong against blocking by lowering the frequency at which communication with the communication base station 200 is being performed.

The communication control unit 1-5 starts communication with a base station other than the communication base station 200.

The communication control unit 1-5 starts communication with a communication device such as another vehicle and starts relay communication using another communication device.

Figure 7:
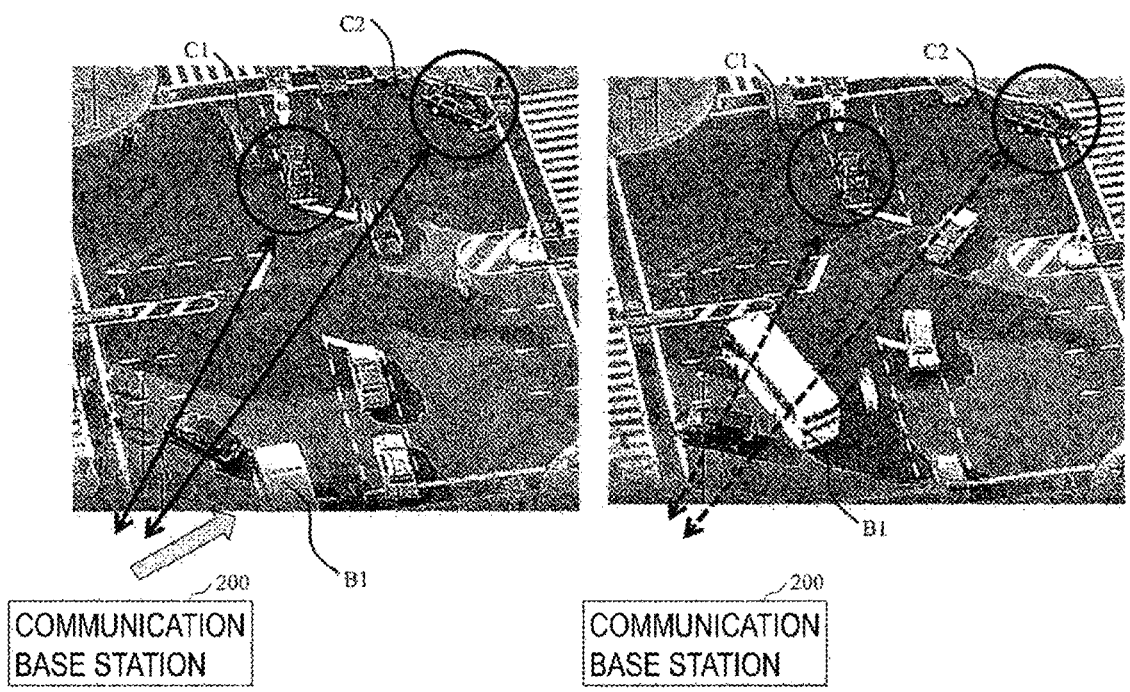
FIG. 7 is a diagram for explaining effects of the communication system according to the present disclosure.

FIG. 7 illustrates a case in which communication is blocked by a large vehicle at an intersection. The communication base station 200 functions as the communication device 1, and the external communication device 2 is provided in the vehicle C1. The communication base station 200 performs communication control according to the present disclosure and has already learned that throughput degradation will occur at the intersection when a large vehicle turns left at the intersection. The effect is caused not always by blocking of the propagation path but a change in complicated propagation state at the intersection. The communication device 1 acquires the fact that the large vehicle B1 has started to turn left from a video of a camera mounted in the communication base station 200 and acquires, at the surrounding environment information collection unit 1-3, the positions, the speeds, and the orientations of the vehicles C1 and C2 and predicts, at the communication prediction unit 1-6, as device information of the device itself, that there is a probability that communication quality of the communication unit 1-4 in the vehicle device may be affected using what will be described below. That is, position information or a sector number (it is possible to determine, from the sector number, whether a sector configured of a directivity antenna mounted in the base station uses the one on the side of the intersection or not) of an antenna device being used for the vehicles C1 and C2 is used. The communication control unit 1-5 performs the following processing in response to the prediction result.

The communication control unit 1-5 lowers the amount of bits per unit time with the vehicle C1 by lowering the modulation scheme, the coding rate, or the like of the communication unit 1-4.

The communication control unit 1-5 lowers a bit rate in the third or higher layers in an ISO reference model. (such as data rate restriction through an improvement in compression rate of the video)

The communication control unit 1-5 lowers the frequency used by the external communication device 2 in the vehicle C1 communicating with the communication base station 200 and uses a frequency that is strong against blocking.

The communication control unit 1-5 causes the external communication device 2 in the vehicle C1 to start communication with a communication base station other than the communication base station 200.

The communication control unit 1-5 causes communication with another communication device in the vehicle C2 or the like and relay communication using another communication device to be started.

The communication control unit 1-5 controls a reflector provided in the communication base station 200 and configured of a metamaterial to cause communication quality, with which the external communication device 2 is communicated, to be improved.

Although the example of the device control according to the present disclosure has been described in FIGS. 6 and 7, it is also possible to expect an effect that communication cost of the user is improved by the communication unit 1-4 of the communication device 1 using communication using an unlicensed band and requiring a very low or free bit cost at a normal time, and starting managed communication using a licensed band or the like and requiring bit cost only in a case in which communication quality degradation as described above is predicted. In this case, if a time required to actually start communication including synchronization, authentication, and the like of the communication in a licensed band is defined as T, it is possible to set a time as a target of prediction of communication quality degradation to T or T+$\Delta$T.

Figure 8:
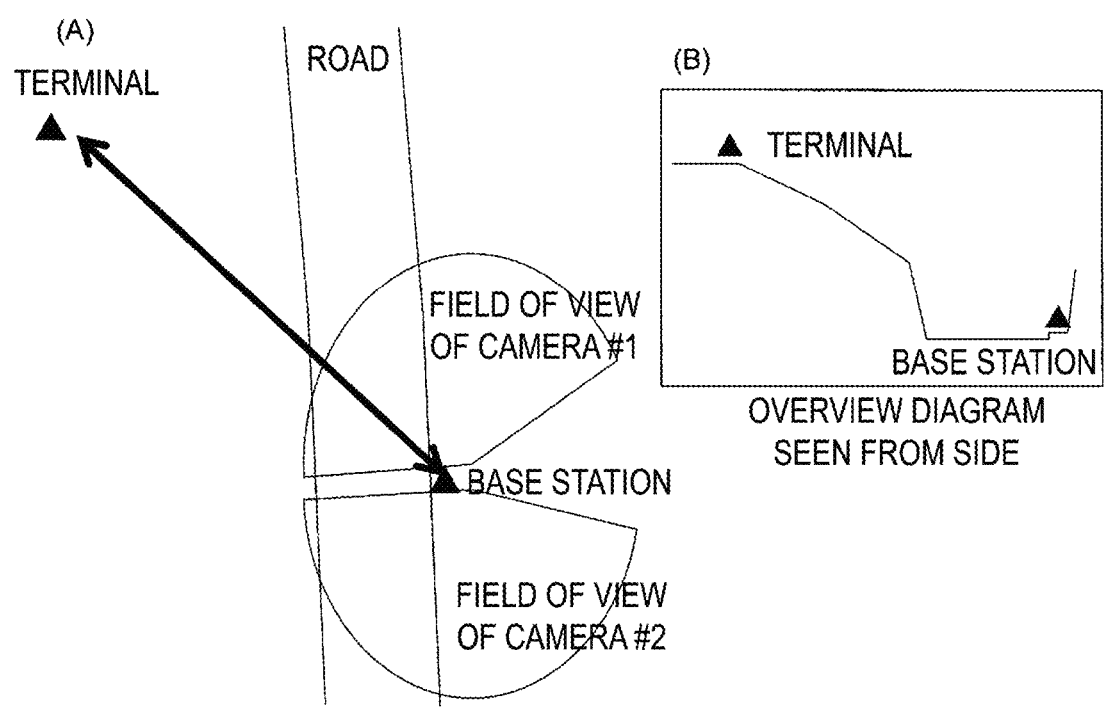
FIG. 8 is a diagram for explaining an experiment conducted in the communication system according to the present disclosure.

FIG. 8 is a diagram of an experiment conducted to check effects of the present disclosure. A wireless LAN base station and a terminal were installed with a road interposed therebetween, and future communication quality was predicted using videos from two cameras. The base station includes the communication device 1, and the terminal functions as the external communication device 2. Here, the wireless LAN used a 5 GHz band channel, and a standardization throughput obtained by dividing a throughput per 20 MHz by an average in the past 30 seconds was used as communication quality. The communication quality was evaluated every 1 second. As the cameras, a camera #1 facing upward and a camera #2 facing downward were used.

Figure 9:
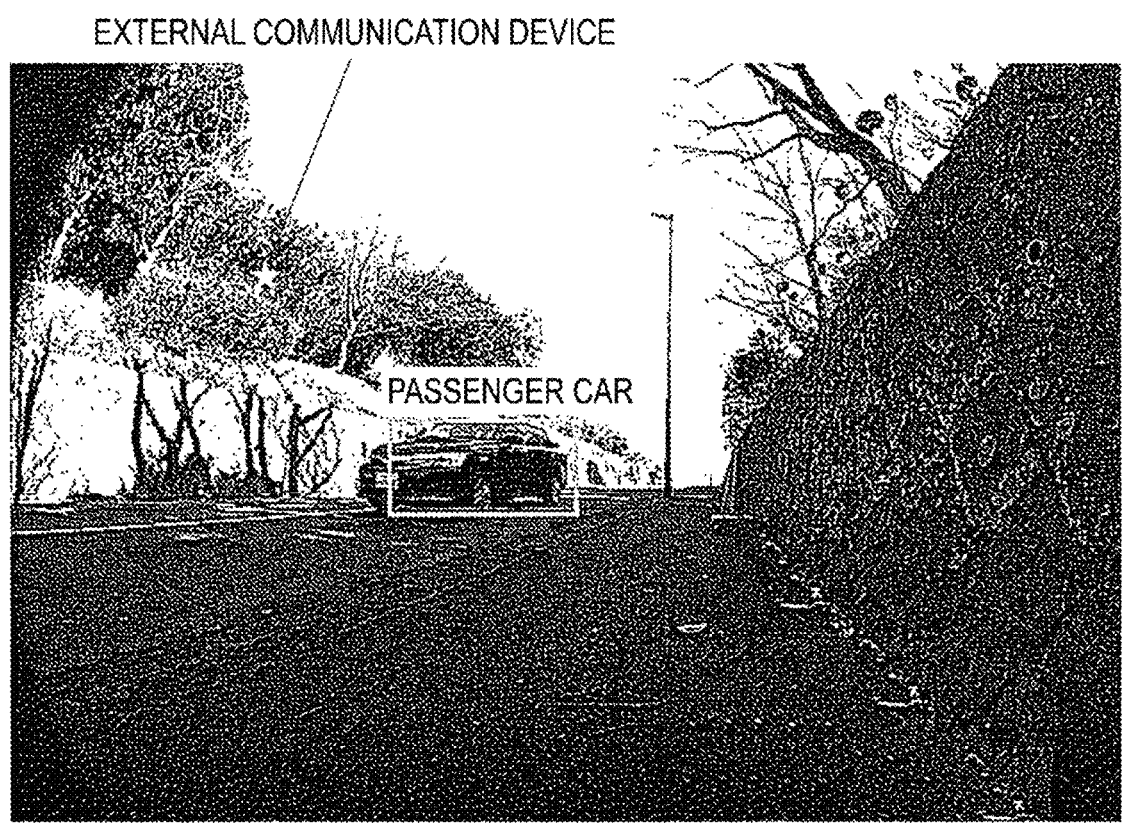
FIG. 9 is a diagram for explaining an experiment conducted in the communication system according to the present disclosure.
Figure 10:
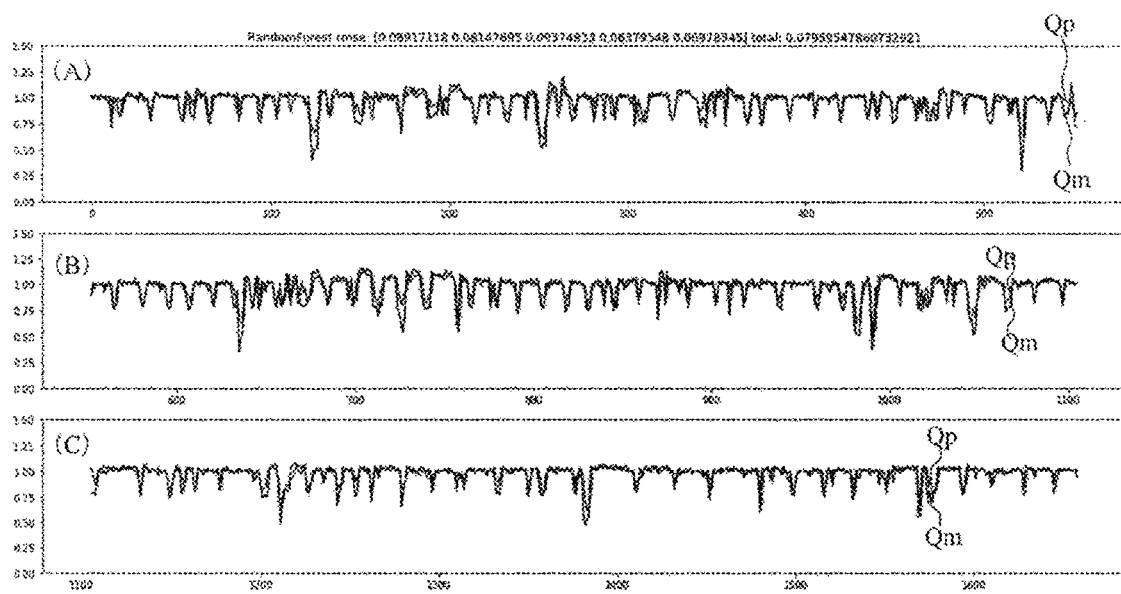
FIG. 10 is a diagram for explaining results of the experiments conducted in the communication system according to the present disclosure.

Here, the videos from the cameras were acquired at 15 FPS, and the sizes on an X axis, the sizes on the Y axis, and the center positions of objects were extracted. Because fifteen pieces of object information were obtained at a cycle (1 second) of evaluating communication quality, fifteen pieces of position information and fifteen pieces of size information were averaged here, and the amounts of change in size and position with respect to the X axis and the Y axis were extracted as moving speeds. A video imaged by the camera #1 in an actual environment and how a vehicle was recognized are illustrated in FIG. 9. Here, the location where the external communication device 2 was present is also illustrated with a star mark for understanding. Although the communication path between the communication base station and the terminal was not blocked even if a passenger car passed, the communication path was blocked in a case in which a bus passed therethrough in the surrounding environment.

Information regarding cars (passenger cars), busses, and pedestrians acquired from the camera #1 and the camera #2, current communication quality, and a signal power obtained in the current communication were used to predict future communication quality of 1 second later. Here, random forest learning was used to predict communication. FIG. 12 illustrates a result of predicting communication quality of 1 second later. In FIG. 12, predicted communication quality Qp and actually measured communication quality Qm are compared. Random forest learning of 500 decision trees was used, data for 3 hours was used and divided into five parts by a k-fold cross validation method, and a result of training using four data sets was used to predict communication quality of the remaining one data set. The result represents a result that also includes a case in which only data at timings when cars and buses go back and forth near the terminal is extracted and there are no influences of passenger cars on communication quality as described above. Focusing on degradation of communication quality, it is possible to confirm that degradation of communication quality was able to be predicted.

The thus obtained result indicates that a modulation scheme, a coding rate, the number of spatial multiplexings used between the base station and the terminal became not appropriate due to degradation of the signal power, or a change in channel due to a Doppler effect of electromagnetic waves reflected by the vehicle and received, a packet loss occurred, and the throughput was thus degraded. It is possible to predict communication quality using the surrounding environment information from the result of FIG. 12, and the communication is thus controlled according to the present disclosure to minimize the influences thereof. In other words, the following communication control can be performed.

Method 1: A modulation scheme, a coding rate, or the number of spatial multiplexings is changed such that the bit numbers to be transmitted are lowered, and the bit rate is lowered in advance in order to prevent a packet error.

Method 2: Priority connection based on QoS control is performed by the same communication scheme before a timing of communication quality degradation, or connection to another communication base station or a relay device is established to multiplex the line or switch the line.

Method 3: Communication using another line such as cellular communication is established before a timing of communication quality degradation to multiplex the line or switch the line at the time of the communication quality degradation.

Method 4: An accessory for improving electromagnetic wave conditions such as a metamaterial or a reflector separately mounted in the communication device is controlled to reduce influences of communication quality degradation.

One kind of the aforementioned communication control may be used alone, the aforementioned communication control may adaptively be used in accordance with an environment or a condition, or an effective strategy may be learned through reinforcement learning.

The communication device (the terminal or the base station) in the aforementioned embodiments may be implemented by a computer. In such a case, the communication device may be implemented by recording a program for realizing each of the components provided in each communication device in a computer-readable recording medium and causing a computer system to read and execute the program recorded in the recording medium. Note that the "computer system" as used herein includes an OS and hardware such as a peripheral device. Further the "computer-readable recording medium" refers to a portable medium such as a flexible disk, a magneto-optical disk, a ROM, and a CD-ROM, and a storage apparatus such as a hard disk installed in a computer system. Besides, the "computer-readable recording medium" may also include such a computer-readable recording medium that stores programs dynamically for a short period of time, one example of which is a communication line used when a program is sent via a communication channel such as a network (e.g., the Internet) and a telephone line, and may also include such a computer-readable recording medium that stores programs for a certain period of time, one example of which is volatile memory inside a computer system that functions as a server or a client in the above-described case. In addition, the program described above may be a program used for realizing some of the components described above, a program that can realize the components described above by being combined with a program that has already been recorded in a computer system, or a program that is realized using hardware such as a programmable logic device (PLD) or a field programmable gate array (FPGA).

The embodiments of the present disclosure have been described above in detail with reference to the drawings. However, specific configurations are not limited to those embodiments, and include any design or the like within the scope not departing from the gist of the present disclosure.

ADDITIONAL DESCRIPTION

An overview of the present disclosure is summarized as follows.

According to the present disclosure, it is possible to perform communication control for better quality that satisfies predefined quality by estimating future communication quality using surrounding environment information of the device acquired by a camera, a sensor, or the like and device information including one or more pieces of information regarding position information/an orientation/a posture/an ID/a state of the device/control of components of the device/control of the device. According to the present disclosure, it is also possible to control communication based on a strategy learned through reinforcement learning from an input of surrounding environment information by learning a more optical measure through reinforcement learning using communication quality as an index for available options (a change in modification scheme, a change in error correction method or coding rate, a change in frequency channel, a change in frequency band, and a method of a communication scheme) for the communication control unit.

INDUSTRIAL APPLICABILITY

A device communicating with an external device can improve communication quality or to avoid communication quality that does not satisfy a requirement by collecting surrounding environment information to acquire information on other than communication with a high correlation with communication quality and selecting, changing, or starting a communication method before a change occurs in the communication.

REFERENCE SIGNS LIST

1 Device
1-0 Device NW unit
1-1 Communication evaluation unit
1-2 Device management unit
1-3 Surrounding environment information collection unit
1-4 Communication unit
1-5 Communication control unit
1-6 Communication prediction unit
2 External communication device
2-0 Network interface
2-4-1, 2-4-N External communication unit

The invention claimed is:
1. A communication device that communicates with an external communication device, the communication device comprising:
a device management unit configured to generate device information including position information of the device itself;
a surrounding environment information collection unit configured to collect surrounding environment information that is information related to a surrounding environment of the device itself;
a communication unit configured to communicate with the external communication device;
a communication prediction unit configured to predict communication quality of the communication unit corresponding to the device information and the surrounding environment information by machine learning using an input and output relationship between the surrounding environment information, the device information, communication quality and setting for control of communication which are learned in advance, and output setting for control of communication corresponding to the predicted communication quality; and
a communication control unit is configured to control the communication unit based on the setting for control of communication output by the communication prediction unit, wherein the surrounding environment information includes a camera video imaged by a visible light camera or an infrared camera, and the communication prediction unit outputs setting for control of communication corresponding to the surrounding environment information.

2. The communication device according to claim 1, further comprising:
a communication evaluation unit configured to evaluate communication quality of the communication unit,
wherein the communication evaluation unit evaluates the communication quality for communication setting for control of communication output by the communication unit selected by the communication prediction unit, and
reinforcement learning is performed to enhance an index related to communication quality among the surrounding environment information, the device information, the evaluated communication quality, and the setting for control of communication, using the communication quality evaluated by the communication evaluation unit.

3. A communication device according to claim 1,
wherein the communication prediction unit detects a communication quality degradation event in which degradation of communication quality is predicted, using the surrounding environment information and the device information, and
if the communication quality degradation event is input, the communication control unit
(i) starts a process for establishing communication with a device that is different from the external communication device, or
(ii) changes at least one of a modulation scheme, a coding rate, and the number of spatial multiplexings used for the communication with the external communication device such that a communication bit number per unit time decreases, or
(iii) controls a signal reflector installed in a communication area, which is a range where the communication unit is able to perform communication, to change a radio wave propagation environment, or
(iv) changes a frequency at which degradation of the communication quality is predicted into a frequency at which the communication quality is predicted to be less changed, or
(iv) changes a communication speed in third or higher layers in an OSI reference model into a mode that supports a lower communication speed.

4. The communication device according to claim 1,
wherein the communication prediction unit detects a communication quality improvement event in which an improvement in communication quality is predicted, using the surrounding environment information and the device information, and
if the communication quality improvement event is input, the communication control unit
(i) starts a process for establishing data communication using a channel at a higher frequency that is able to be used due to the improvement in the communication quality, or
(ii) changes at least one of a modulation scheme, a coding rate, and the number of spatial multiplexings used for the communication with the external communication device such that a communication bit number per unit time increases, or
(iv) changes a communication speed defined in third or higher layers in an open system interconnection (OSI) reference model into a mode that supports a higher communication speed.

5. The communication device according to claim 1, wherein the device information includes at least one kind of the position information of the device itself, speed information of the device itself, information regarding a position, an orientation, or directivity of an antenna of the communication unit, communication information of the communication unit, power supply information of the device itself, information unique to the device itself, and position information or speed information of components of the device itself.

6. A communication system comprising:
   the communication device according to claim 1; and
   the external communication device.

* * * * *